(No Model.) 3 Sheets—Sheet 1.

J. F. DORNFELD.
MALT TURNING AND STIRRING MACHINE.

No. 539,860. Patented May 28, 1895.

Witnesses.
Inventor.
John F. Dornfeld,
By Benedict & Morsell
Attorneys.

(No Model.)    J. F. DORNFELD.    3 Sheets—Sheet 2.
MALT TURNING AND STIRRING MACHINE.
No. 539,860.    Patented May 28, 1895.

Witnesses.    Inventor.
John F. Dornfeld,
By Benedict & Morsell
Attorneys.

(No Model.) 3 Sheets—Sheet 3.

J. F. DORNFELD.
MALT TURNING AND STIRRING MACHINE.

No. 539,860. Patented May 28, 1895.

Witnesses.
Inventor.
John F. Dornfeld
By Benedict & Morsell
Attorneys.

UNITED STATES PATENT OFFICE.

JOHN F. DORNFELD, OF CHICAGO, ILLINOIS.

MALT TURNING AND STIRRING MACHINE.

SPECIFICATION forming part of Letters Patent No. 539,860, dated May 28, 1895.

Application filed September 4, 1894. Serial No. 522,060. (No model.)

*To all whom it may concern:*

Be it known that I, JOHN F. DORNFELD, of Chicago, in the county of Cook and State of Illinois, have invented a new and useful Improvement in Malt Turning and Stirring Machines, of which the following is a description, reference being had to the accompanying drawings, which are a part of this specification.

My invention has relation to malt turning and stirring machines.

The object is to provide, in a machine of this character in which mechanism is employed for propelling the carriage and reversing the line of travel thereof, a construction in which the least possible number of parts are employed, thereby greatly simplifying the mechanism and cheapening the cost of manufacture.

The invention also contemplates as an object an improved malt turning plow or shovel to be used in connection with the machine, which malt turning plow or shovel is of such construction that all the portions of the malt, even the uppermost layers, are prevented from accumulating upon the plows without moving thereon, and are compelled to travel up the inclines until discharged at the top and rear of the shovel whereby the complete lifting and breaking up of the mass of malt is insured.

The invention consists of the devices and their parts, or equivalents, as hereinafter more fully described and claimed.

Figure 1:
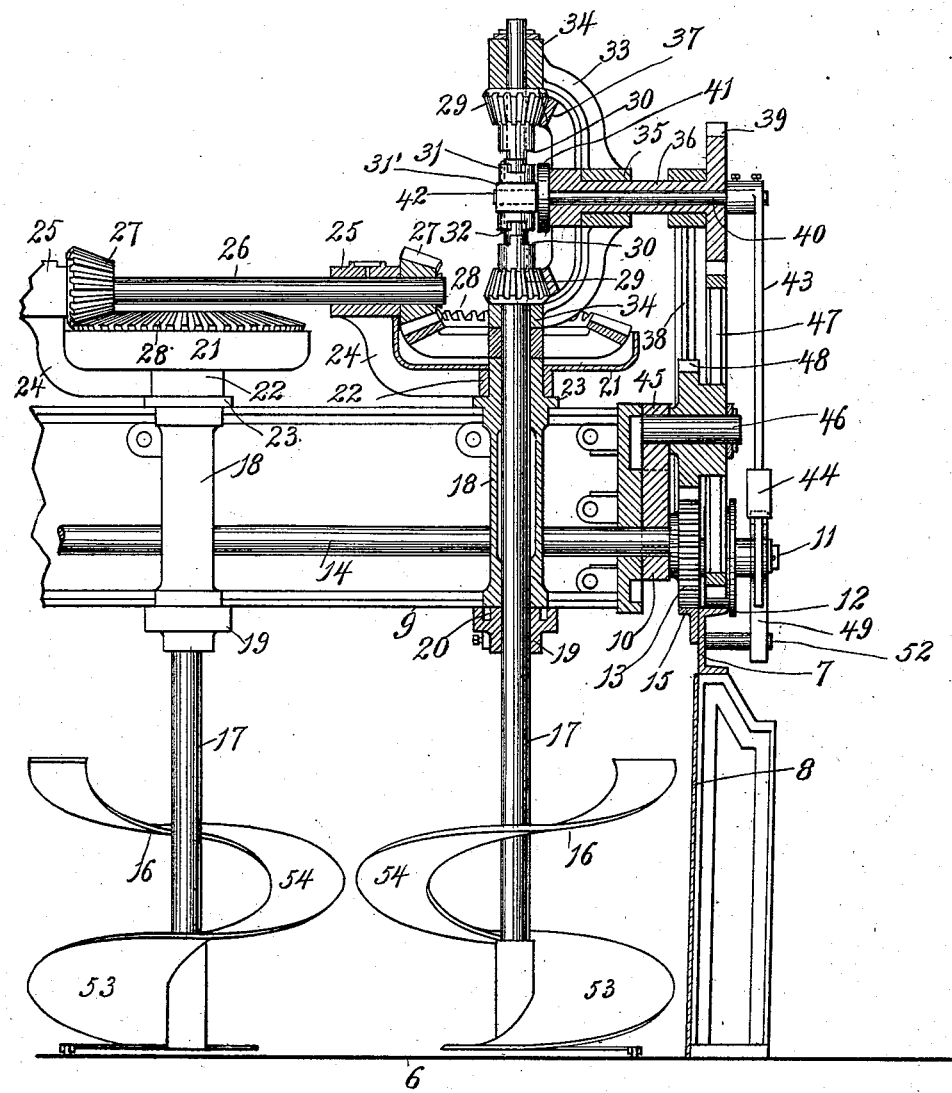
Figure 2:
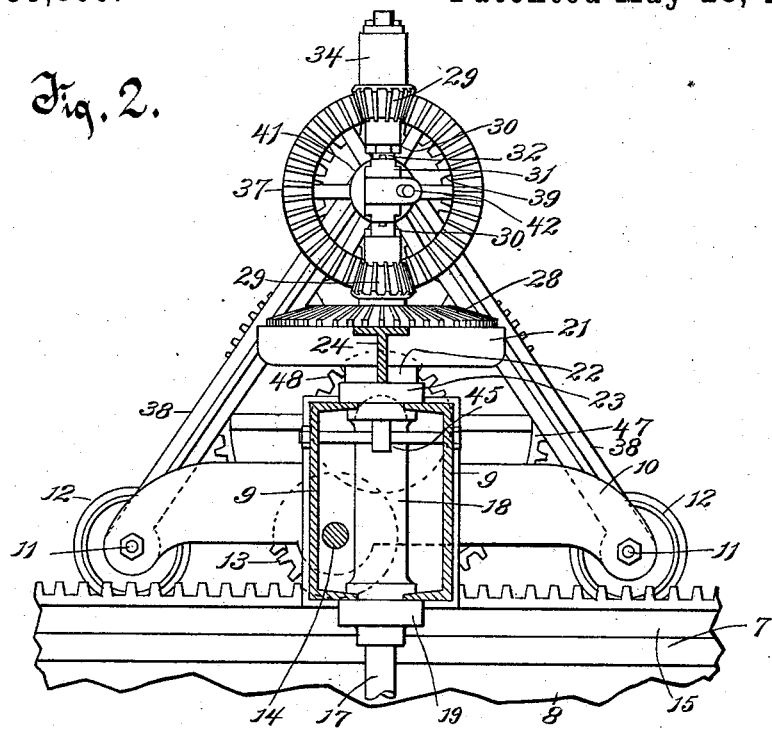
Figure 3:
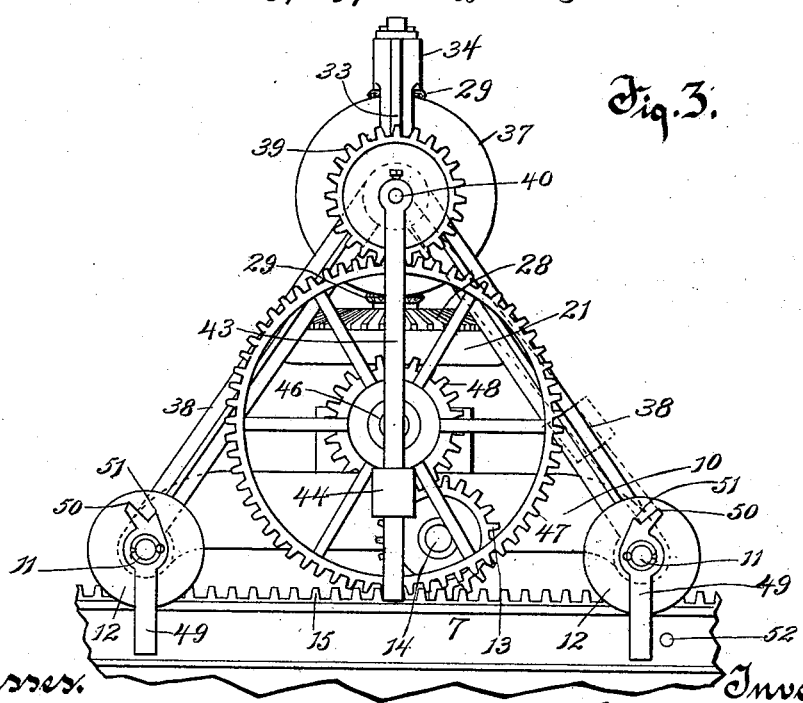
Figure 4:
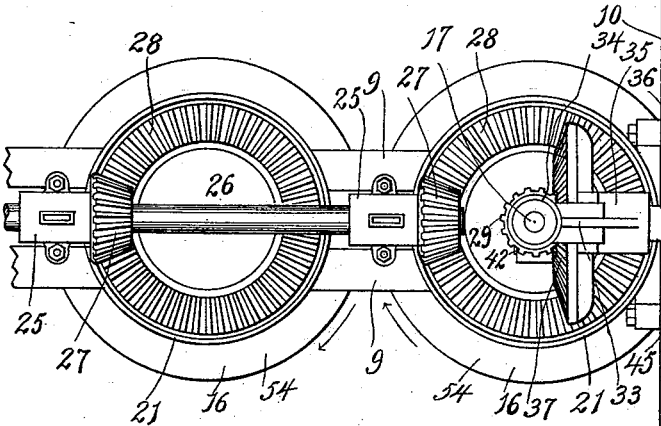
Figure 5:
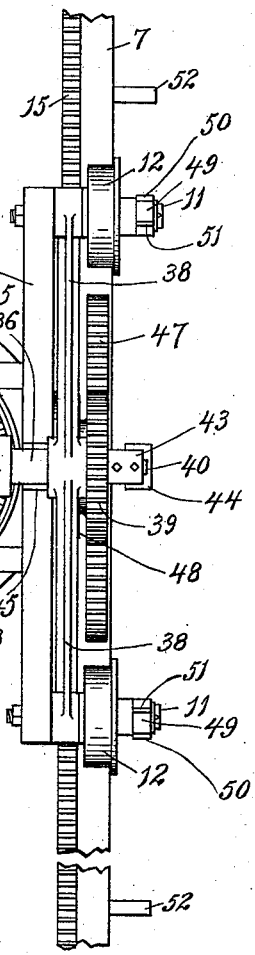
Figure 5:
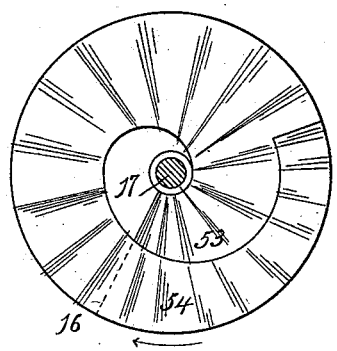

In the accompanying drawings, Figure 1 is a partly-sectional view through the propelling and reversing end of the machine. Fig. 2 is a transverse sectional view of Fig. 1. Fig. 3 is a side elevation of Fig. 2. Fig. 4 is a plan view of Fig. 1, and Fig. 5 is a plan view of one of the plows or shovels.

Like numerals of reference denote like parts throughout the several views.

Referring to the drawings, the numeral 6 indicates a floor of an ordinary malting room. A track, consisting of rails 7, is fixed horizontally on the tops of walls, such as 8. A carriage is located above the malting floor, and extends transversely across the room. The sides of this carriage are formed of two channeled beams 9, 9, the top and bottom flanges of which extend inwardly toward each other. At opposite ends of the carriage are provided the arms 10, 10, from which project axles 11, 11, upon which axle wheels, 12, 12 are mounted and travel on the rails 7. Gear wheels, such as 13, fixed on a shaft 14 journaled in the carriage, mesh with the racks 15 fixed on the tracks 7. By this means, in connection with a connecting system of gearing hereinafter referred to the carriage is capable of being driven slowly back and forth across the room over the malting floor.

For elevating and stirring the malt on the malting floor 6, there is a series of spiral shovels 16, fixed on vertically disposed shafts 17. These shovels are located along the carriage at such distances apart, and in such manner, as to sweep and raise all the malt over the malting floor during the progress of the carriage across the floor from one extremity to the other. The shafts 17 are surrounded medially by sleeves 18, said shafts passing loosely therethrough so as to rotate freely therein. On each shaft 17, and fitting against the end of the sleeve 18, is a set collar 19. This set collar forms a bearing against the sleeve, and prevents all up and down movement of the shafts 17. This set collar also has a recess or cavity 20 therein to catch the lubricating oil.

The numeral 21 indicates drip cups, each cup being provided with a depending hub 22 which tightly surrounds the sleeve 18, and rests on an annular flange 23 of said sleeve. Extending from the depending hub is an angular arm 24, said arm formed at its upper end with a bearing 25. Through these bearings of the arms 24 passes a shaft 26, said shaft carrying a series of beveled pinions 27, which mesh with a series of beveled gears 28, each gear, respectively, being secured rigidly to the upper end of a shaft 17, for imparting rotation thereto.

The parts thus far specifically set forth are fully described in my application for Letters Patent, for improvements in malt turning or stirring machines, filed April 9, 1894, Serial No. 506,848. The means for rotating the shaft 26 were also fully described in said application for patent, and hence no specific mechanism for rotating said shaft need be shown herein. I desire, however, to employ said means described in the application referred to for rotating the shaft 26, or any other suitable and desirable means for that purpose.

The present improvements will now be specifically described.

The shaft 17 at one end of the machine, as clearly shown in the drawings, has its upper end extended, and on this extended end are carried loosely two beveled pinions 29, 29, said pinions provided with projecting clutching hubs 30, 30 which take into the respective ends of a clutch 31, splined to the shaft by means of a feather 32. The upper pinion 29, it will be noted, is supported by an enlargement of the shaft 17, the enlargement being located just beneath the clutch hub of said pinion, as clearly shown by the dotted lines Fig. 1.

The numeral 33 indicates a bearing arm which is provided with end bearings 34, 34 for the shaft 17, and a central bearing 35 for a tubular shaft 36, said shaft formed or provided upon its inner end with a large beveled gear 37 which meshes with the two beveled pinions 29, 29. The shaft 36 has a bearing near its outer end at the upper ends of arms 38, 38, said arms extending down at inclines to the axles 11, 11 on which axles the lower ends of the arms are mounted. A toothed wheel 39 is formed at the outer end of shaft 36. Passing through the bore of said shaft 36 is another shaft 40, said shaft 40 carrying at its inner end a rigid disk or wheel 41, said wheel provided with a crank-pin 42 which connects with a clutch collar 31'. Connected to the outer end of shaft 40 is a lever 43, said lever provided near its lower extremity with a weight 44.

Extending up from the end carriage arm 10 is a bearing 45. In this bearing is journaled a short shaft 46, said shaft having mounted thereon the hub of a toothed wheel 47, the teeth thereof meshing with the teeth of wheel 39. This hub of the toothed wheel 47 is also formed on its inner end with a smaller toothed wheel 48 which meshes with the adjacent toothed wheel or gear 13 of shaft 14.

Fixed to the outer ends of the axles 11, 11 are depending catches 49, 49, said catches being each provided with inclined fingers 50, 50 and with shoulders or offsets 51, 51.

Pins 52 project out laterally from opposite extremities of one of the tracks 7. These pins are adapted to be engaged by the depending catches 49 when the carriage has completed its longitudinal movement in either direction.

In the operation of my invention, rotation is imparted to the shaft 26. As the shaft 26 is thus rotated, the beveled pinions 27 thereof meshing with the beveled gears 28 of the plow shafts 17 will impart rotation to said shafts and their plows, so that the same will all rotate in one direction. As illustrated in Fig. 1 of the drawings, the clutch 31 occupies a central position between the clutching hubs of the two beveled pinions 29, 29 carried by the extended plow shaft, the lever 43 hanging perpendicularly. The machine, therefore, is at a stand still. If, now, the lever 43 be thrown over by hand to the dotted line position illustrated in Fig. 3, so as to be supported by the finger 50 and to rest against the shoulder 51 of the depending catch 49, the clutch 31, through the medium of the crank-pin 42, will be lowered, so as to engage with the lower pinion 29, and consequently hold said pinion fast to the shaft. The system of gearing is, therefore, connected up from the lower pinion 29, large beveled gear 37, toothed wheel 39, toothed wheel 47, smaller toothed wheel 48, and gear wheel 13. In view of this connection the machine is moved along longitudinally to the right of Fig. 3 until it reaches a point near the end of the compartment, at which point one of the depending catches 49 comes into contact with a pin 52. This pin, of course, has the effect of tilting the depending catch and thereby releasing the end of the weighted lever from the finger and shoulder of the catch. The moment the lever is thus released, the travel of the machine is, of course, stopped, said lever finally coming to rest at the perpendicular position indicated. If, now, it is desired that the machine should travel back in an opposite direction to its first line of travel, all that is necessary is for the operator to throw the lever 43 over into engagement with the finger 50 of the left hand depending catch 49, Fig. 3. The effect of this will be to throw the clutch 31 into engagement with the upper beveled pinion 29, when, of course, the travel of the machine is reversed.

It will be noticed that the finger 50 and shoulder 51 of each depending catch 49 is so arranged that it is impossible for the lever 43 to become accidentally disengaged therefrom, the disengagement being rendered possible only when the catch comes into contact with the pin 52.

It will be seen from the above description that I provide a simple gearing for propelling the carriage and reversing its longitudinal travel, in which the number of parts are reduced to the mininum, and consequently the expense in manufacturing greatly diminished, without in the least sacrificing the successful working of the machine; also, but the slightest power is required for upsetting the depending catches 49 and consequently releasing the lever 43, so as to bring the machine to a standstill, thereby providing a construction which will permit of the parts being set so that the machine can run up quite close to the ends of the compartment, inasmuch as but very little travel of the machine and very little power is required to accomplish the uncoupling.

The spiral malt stirring plows or shovels 16 employed in connection with my invention are fully shown in Figs. 1 and 5. From these figures it will be seen that the lower portions 53 are considerably wider than the upper portions of the plows, and these lower portions extend so as to surround, and to be attached to, the plow shafts. The upper portions 54 of the shovels or blades are reduced in width, or cut out, so as to stand away from the shafts, leaving a space between their inner edges and said shafts. This particular construction of spiral shovel or plow possesses decided advantages. It is, of course, self-evident that the under layers of malt upon the malting floor are under pressure by reason of the weight of the layers above. There is consequently a resistance offered to these under layers, whereby the malt is enabled to travel up the spiral blade, and not carried around bodily therewith, without independent movement thereon. The fact, therefore, that the lower portion of the blade is somewhat wide makes but very little difference, inasmuch as the increased friction resulting from a wide blade does not exercise a sufficient retarding influence to prevent the under layers of malt from traveling up the blades, owing, as before stated, to the resistance offered to said under layers by the weight of the layers above. Besides, it is advantageous to make the lower portion of the spiral blade of considerable width, inasmuch as it makes the same quite firm, and affords the means for securely attaching the plow to its shaft. In regard to the upper layers of malt, it is evident that there is no pressure exerted thereon except that involved in their own weight, and consequently the resistance offered thereto is reduced to the minimum. It is, therefore, a desideratum to decrease the width of the upper portion of the spiral blade as much as possible, so as to reduce the frictional surface, and thereby to remove as far as possible all retarding influences to the travel of the upper layers of malt up the spiral blade. Some resistance, however, should be provided for the upper layer of malt, or else there is danger of its being carried around bodily with the spiral shovel, without moving upwardly thereon, notwithstanding the fact of the reduction of the width of the upper portion of said shovel. To provide this resisting influence, I employ helical plows or shovels which are so geared that any portion of one is half a rotation in advance of the corresponding portion of the other. As the shafts all rotate in the same direction, it will be obvious, therefore, that the edges of the plows projecting toward and adjacent to each other will pass each other moving in opposite directions, whereby, by the cross strain and resistance of the shovels against the malt, the upper layer is made to travel up the reduced portions 54 of the blades. It is obvious also that the spaces formed between the upper portions of the blades and of the shafts, further assist toward securing this upward movement of the upper layer of malt on the shovels, in view of the fact that as the shovels revolve around in a practically united mass of malt, that portion of the mass which lies in the spaces between the inner edges of the upper reduced portions of the shovels and the shafts, is torn or separated from that part of the mass lying on the shovels, consequently resulting in a tearing away and separating of the united mass, whereby a greater resistance is offered, and consequently that portion of the mass on the reduced spiral portion of the shovel is still further assisted in its movement up the incline or spiral.

Having thus described my invention, what I claim, and desire to secure by Letters Patent, is—

1. In a malt stirring machine, the combination, of rails and racks, a carriage provided with wheels traveling on the rails, toothed wheels on the carriage and engaging the racks, a series of rotatable plow shafts carried by the carriage, the shaft at one end carrying pinions loosely thereon, a clutch splined on said shaft intermediate the pinions, a system of gearing between said loose pinions and one of the toothed wheels which engages the rack, and means for throwing the clutch into engagement with either of the loose pinions, for changing the direction of movement of the carriage, substantially as set forth.

2. In a malt stirring machine, the combination, of rails and racks, a carriage provided with wheels traveling on the rails, toothed wheels carried by the carriage and engaging the racks, a plow shaft having pinions mounted loosely thereon, a clutch splined on said shaft intermediate the pinions, a system of gearing between said pinions and one of the toothed wheels which engages a rack, a shaft having one end eccentrically connected to the clutch, a lever secured to the opposite end of the shaft, catches adapted to be respectively engaged by the free end of the lever to retain the clutch in adjusted position, and means for automatically releasing said catches upon the completion of the travel of the machine in either direction, substantially as set forth.

3. In a malt stirring machine, the combination, of a traveling carriage, a rotatable plow shaft, loose pinions thereon, a clutch splined on the shaft intermediate said pinions, a shaft having one end eccentrically connected to the clutch, a lever secured to the opposite end of said shaft, depending catches provided with inclined fingers and with shoulders adapted to be engaged by the free end of the lever, and to thereby retain the clutch in adjusted position, and means for automatically releasing said catches from engagement with the end of the lever upon the completion of the travel of the machine in either direction, substantially as set forth.

4. In a malt stirring machine, the combination, of rails and racks, a carriage provided with wheels traveling on the rails, toothed wheels carried by the carriage and engaging the racks, a series of rotatable plow shafts mounted in the carriage, the shaft at one end carrying pinions loosely thereon, a clutch splined on said shaft intermediate the pinions, a horizontal shaft carrying on one end a beveled gear meshing with the two pinions, and on its opposite end a toothed wheel, a system of gearing between said toothed wheel and one of the toothed wheels which meshes with a rack, and means for throwing the clutch into engagement with either of the loose pinions, substantially as set forth.

5. In a malt stirring machine, the combination, of a carriage reciprocative over a malting floor, a series of vertically-disposed spiral shovels, so geared that any portion of one is half a rotation in advance of the corresponding portion of the other, whereby two adjacent points of their outer edges are always opposite, and means for rotating the several shovels in the same direction, whereby said opposite edges will pass each other in opposite directions, substantially as set forth.

6. In a malt stirring machine, the combination, of a carriage reciprocative over a malting floor, a series of vertically-disposed shafts, spiral shovels carried by said shafts, and so geared that any portion of one is half a rotation in advance of the corresponding portion of the other, whereby two adjacent points of their outer edges are always opposite the upper portions thereof having spaces between their inner edges and the shafts, and means for rotating the several shafts in the same direction, whereby said opposite edges of the shovels will pass each other in opposite directions, substantially as set forth.

7. In a malt stirring machine, the combination of a carriage reciprocative over a malting floor, a series of plow shafts carrying beveled gears at their upper ends, a rotatable horizontal shaft carrying beveled pinions meshing with the beveled gears, a series of spiral shovels at the lower ends of the plow shafts, said shovel being so geared that any portion of one is half a rotation in advance of the corresponding portion of the other, whereby two adjacent points of their outer edges are always opposite, and means for rotating the several shafts in the same direction, whereby said opposite edges of the shovels will pass each other in opposite directions, substantially as set forth.

In testimony whereof I affix my signature in presence of two witnesses.

JOHN F. DORNFELD.

Witnesses:
ARTHUR L. MORSELL,
ANNA V. FAUST.